United States Patent

[11] 3,590,631

| | | | | |
|---|---|---|---|---|
| [72] | Inventor | Andre Gonze<br>Koningsloo-Vilvorde, Belgium | | |
| [21] | Appl. No. | 810,168 | | |
| [22] | Filed | Mar. 25, 1969 | | |
| [45] | Patented | July 6, 1971 | | |
| [73] | Assignee | Solvay & Cie<br>Brussells, Belgium | | |
| [32] | Priority | Apr. 4, 1968 | | |
| [33] | | Belgium | | |
| [31] | | 56,716 | | |

[54] STRENGTH TESTING OF RIGID PLASTIC MATERIALS
5 Claims, 4 Drawing Figs.

[52] U.S. Cl. .................................................. 73/95, 73/101
[51] Int. Cl. .................................................. G01n 3/08
[50] Field of Search............................................ 73/95, 101

[56] References Cited
UNITED STATES PATENTS
3,224,258  12/1965  Preston ....................... 73/95
FOREIGN PATENTS
1,064,736  9/1959  Germany....................... 73/101

Primary Examiner—Jerry W. Myracle
Attorney—Spencer & Kaye

ABSTRACT: A method and apparatus for determining the brittleness of rigid plastic materials by subjecting samples of a material to be tested to a measured longitudinal tension and applying to the midpoint of the sample an impact of a type which produces a notch, the impact having a given energy content and a direction perpendicular to the direction of the applied tension force. A measure of the brittleness of the material is obtained by determining the minimum tension force for which a given impact will rupture the sample.

INVENTOR.
André Gonze
BY Spencer & Kaye
ATTORNEYS

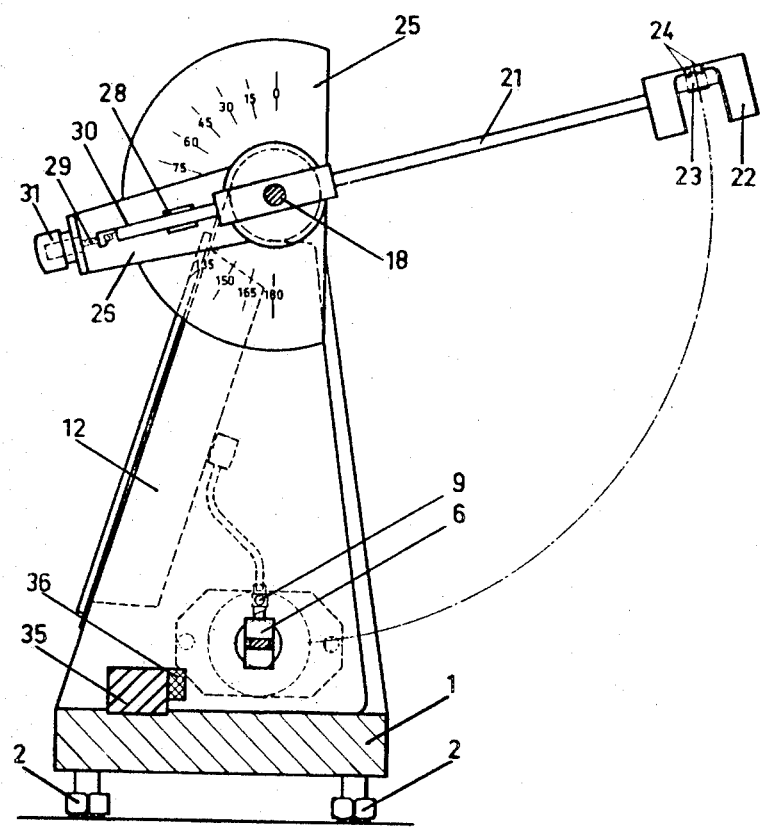

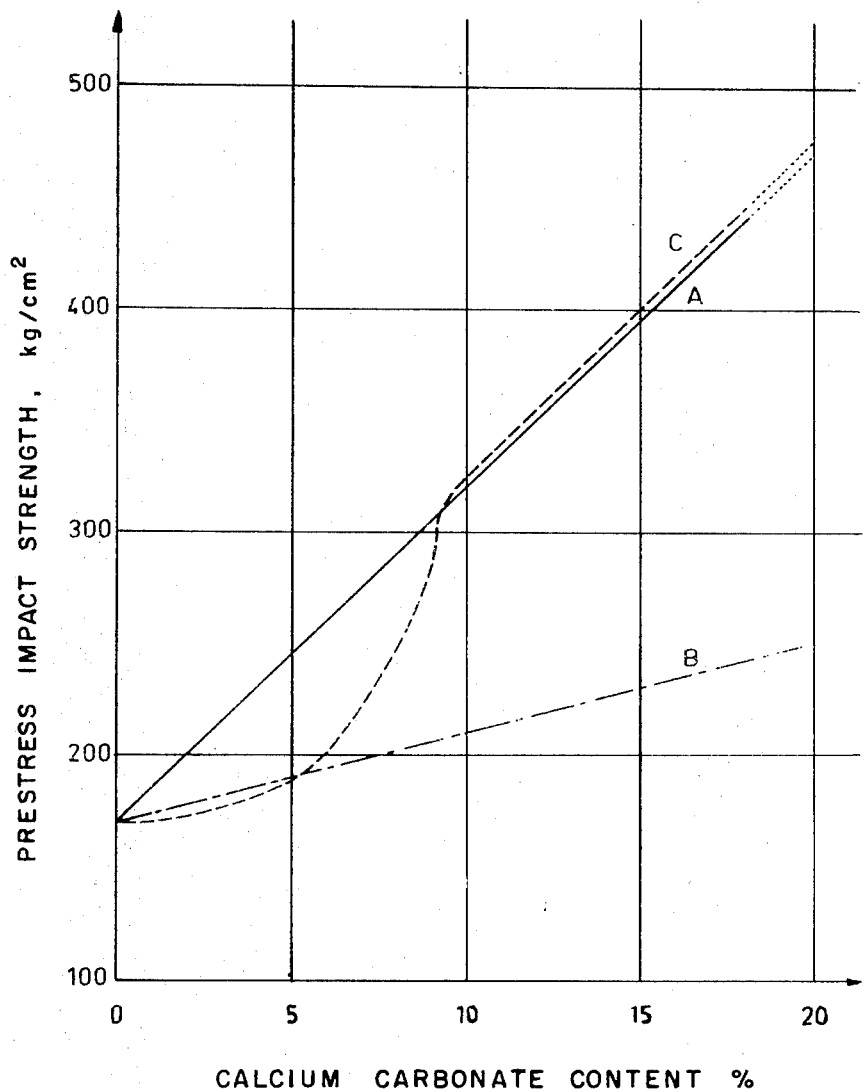

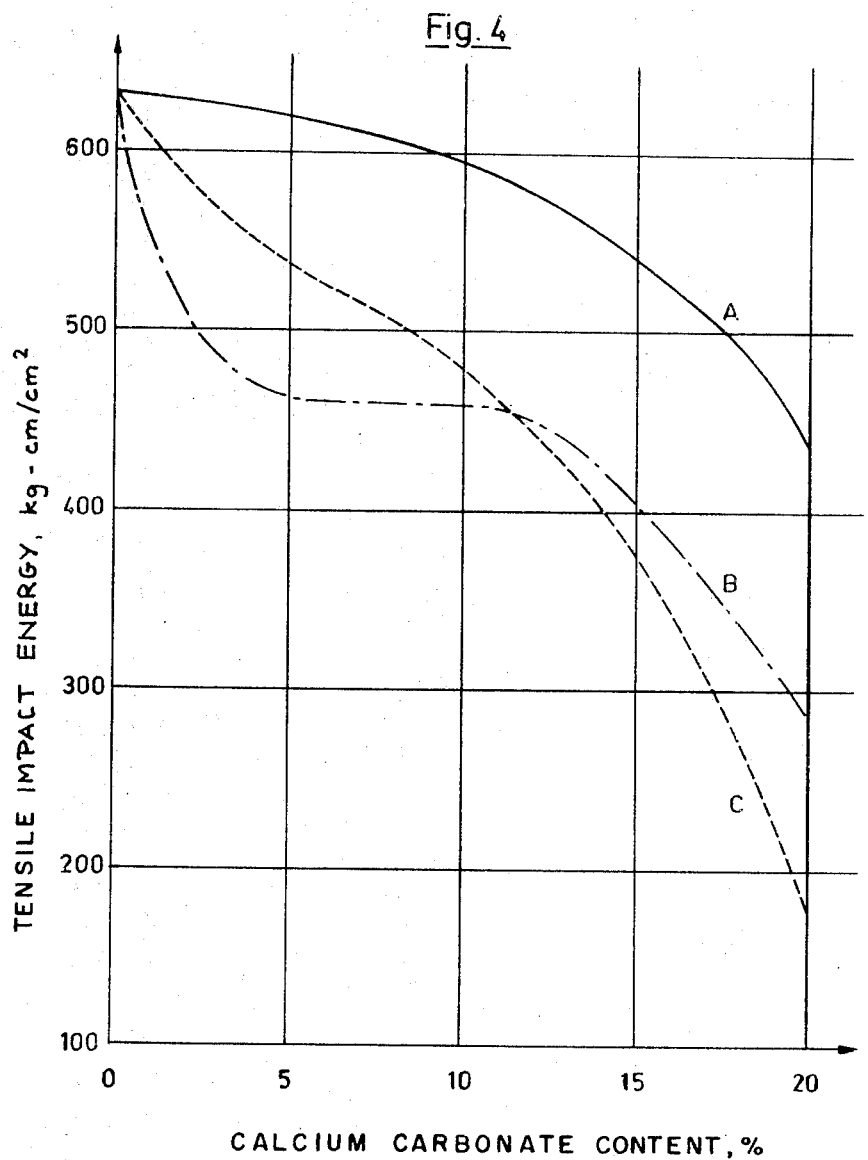

STRENGTH TESTING OF RIGID PLASTIC MATERIALS

BACKGROUND OF THE INVENTION

The present invention relates to material testing, and particularly to tests for determining the brittleness of a rigid plastic material.

It is well known that finished products made of various rigid plastic materials can experience a brittle rupture when they are subjected to stresses. This brittle rupture of a finished product is a phenomenon which appears to be complex and experience has shown that shock tests of the type which have been employed to date on samples of these materials often do not provide an exact indication of the actual brittleness, or fragility, of a finished product made of such material. Moreover, it must be recognized that there does not presently exist any agreement on the preference to be given to any one type of shock test among all of those currently known in the art. By way of example, one can find in the technical literature numerous results obtained by carrying out resilience tests of the Izod and Charpy type. These results show that the practical behavior of certain resinous materials, in the form of shaped or assembled products, does not always correspond to the behavior predicted by the results of these tests carried out on small samples of such materials. Thus, the Izod resilience at 20° C., on notched samples, has a value of 4 to 5 kg.-cm./cm. for a polycarbonate while the same property can have a value as high as 6 or 8 kg.-cm./cm. for certain nonreinforced polyvinyl chlorides which are however, notoriously brittle, or fragile.

In fact, a study of the fragility of a finished product can involve three considerations:

1 an evaluation of the energy necessary to propagate a fissure in the base material starting from a defect having given dimensions;

2 an evaluation of the dimensions and the number of defects present in the base material and subsequently in the finished product and their effect on the formation of fissures; and 3 an evaluation of the distribution and intensity of the tensions which preexist in the finished product.

The first two considerations permit a determination of the characteristics of the base resin, while the third factor is depending of the processing of the finished product.

It is quite evident that a knowledge of this last factor, i.e. the distribution and intensity of the tensions preexisting in the finished product, can only be acquired by carrying out tests on the finished product under conditions as close as possible to those which will exist in use. These tests do not permit, however, an accurate comparison of the base materials from the point of view of fragility because the results which can be recorded are a function, to a great extent, of the processing conditions.

Tensile impact tests generally consist in submitting a sample in the form of a dumbbell, and preferably having a relatively long central portion of rectangular cross section, to a rapidly applied longitudinal tension force by means of a pendulum-type device or a free-falling weight and in recording, in the case of a pendulum, the energy absorbed, and in the case of a free-falling weight, the energy necessary for provoking the rupture of the sample. Such tests can, within certain limits, provide very useful indications in the study of the fragility of a base material.

Thus, because such test is carried out on a sample which is not notched, and because the stress values are therefore identical at every plane perpendicular to the direction of the rapidly applied force, it is virtually certain that the rupture, whether it is ductile or brittle, will commence along the plane at which the largest defect in the sample is located.

It can thus be recognized that this test could prove very useful for providing a certain knowledge of the dimensions and number of defects present in a given material. However, it does not give any indication regarding the energy necessary for propagating a fissure in the material under study. It thus does not permit the achievement of evaluation 1 set forth above, which evaluation is necessary for permitting a complete determination of the ability of a material to resist a brittle rupture.

SUMMARY OF THE INVENTION

It is a primary object of the present invention to eliminate this shortcoming in the material testing art.

A more specific object of the invention is to permit an accurate evaluation of the characteristic in question, particularly for rigid plastic materials.

A further object of the invention is to permit such evaluation to be effectuated in a rapid and simple manner.

Still another object of the invention is to permit an accurate and reproducible determination of the energy necessary for propagating a fissure in a test material starting from a defect having given dimensions.

These and other objects according to the invention are achieved by a method for determining the brittleness of a rigid plastic material, which method includes the steps of subjecting a standardized sample of the material to a longitudinal tensile force, producing an impact against the side of the sample with an element which produces a notch while the sample is subjected to such tensile force, the impact having a predetermined energy content and being substantially perpendicular to the direction of the tensile force, and determining the minimum tensile force value, or prestress impact strength, at which such impact produces a brittle rupture of the material.

The process according to the invention thus permits a determination of the prestress impact strength, or critical tensile strength, of the material under consideration, the critical impact strength being equal to the minimum longitudinal tensile stress, in $kg./cm.^2$, applied to a standardized sample of the material at which a shock impact which produces a notch in the sample under accurately defined conditions gives rise to the substantially instantaneous propagation of a brittle rupture in a direction perpendicular to the applied tensile force.

The objects according to the invention are also achieved by the provision of novel apparatus for determining the value of the prestress impact strength of a rigid plastic material. This apparatus essentially includes tension means for subjecting a sample of such material to a controlled tension force, tension measuring means operatively associated with the tension means for producing an indication of the amplitude of the tension force applied to such sample, and striking means positioned for producing an impact having a predetermined energy content in a direction substantially perpendicular to the direction of such tension force. The striking means include a striker element arranged to apply such impact to the middle of the sample and shaped to cause such impact to produce a notch in the sample.

The tension means preferably include two jaws, one of the jaws being connected to the tension measuring means and the other of the jaws being connected to a device for applying the tensile force. The tension measuring means are preferably constituted by a dynamometer. The striking means for delivering at the center of the sample a notch-producing shock having a predetermined energy content are preferably constituted by a pendulum unit whose free end carries a metal mass having a slot in which is disposed a blade constituting the striker element. The striking means also include a blocking system capable of holding the pendulum at any desired initial inclination and of suddenly releasing the pendulum when desired.

BRIEF DESCRIPTION OF THE DRAWINGS

FIG. 2 is a cross-sectional view taken along the line 2-2 of FIG. 1.

FIG. 3 is a chart illustrating the results produced by devices according to the invention.

FIG. 4 is a chart similar to that of FIG. 3 corresponding to modified sample stress conditions.

DESCRIPTION OF THE PREFERRED EMBODIMENTS

Figure 1:
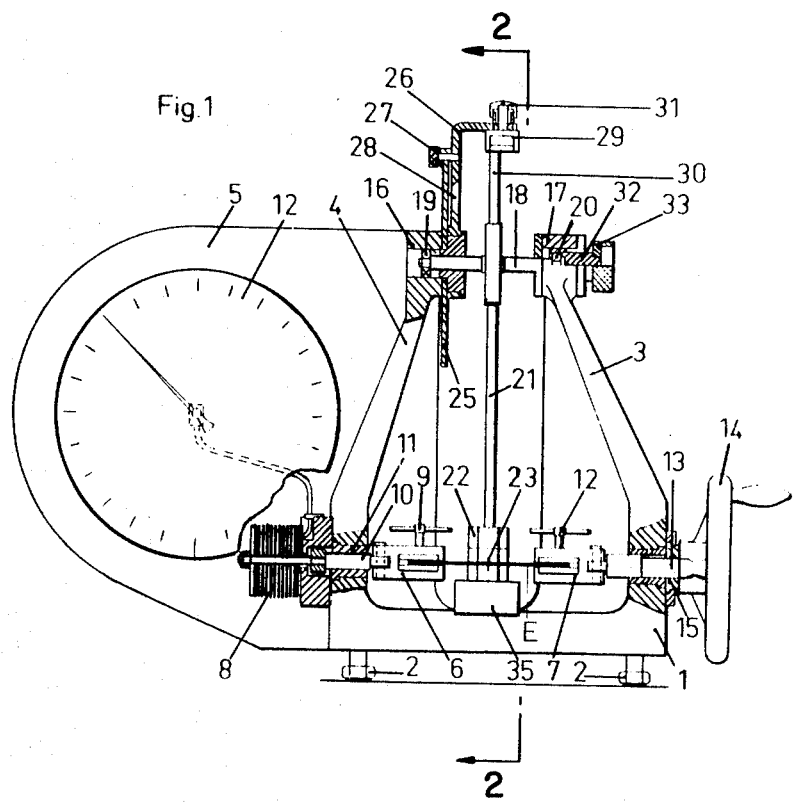
FIG. 1 an elevational view, partially in cross section, of a preferred embodiment of the present invention.

A preferred embodiment of the testing apparatus for carrying out the present invention is shown in FIGS. 1 and 2 to include a base 1 equipped with level-adjusting screws 2 and supporting two arms 3 and 4 and a housing 5.

The traction unit includes two gripping jaws 6 and 7, a dynamometer 8 and a load-applying device 13.

The first set of jaws 6 are equipped with a gripping screw 9 for the test sample E and are rigidly connected to a shank 10 traversing a bearing 11 provided at the base of arm 4. The shank 10 is directly connected to the dynamometer 8 whose indicator 12 is disposed in the housing 5 and is directly graduated in kg./cm.²

The second set of jaws 7, also provided with a gripping screw 12 for the sample E, is rigidly connected to a threaded shank 13 keyed in a handwheel 14. This threaded shank 13 traverses a threaded collar 15 attached to the base of arm 3.

With this arrangement, when a sample E is gripped between the jaws 6 and 7, it is only necessary to turn the handwheel 14 in the proper direction to subject the sample to a traction force which is measured by the dynamometer.

The upper ends of arms 3 and 4 support bearings 17 and 16, respectively, the bearings being connected together by a cylindrical shank 18 mounted in ball bearings 20 and 19, respectively. This shank 18 supports, at its center, a pendulum arm 21 whose free end carries a metallic mass 22 having a U-shaped configuration, as best seen in FIG. 2. At the center of the base of the U formed by the mass 22 is formed a narrow slot which extends through the base and which is oriented parallel to the longitudinal axis of arm 21. Within this slot is inserted a relatively thin metallic blade 23. The orientation of this blade is shown in FIG. 1. The distance by which the edge of the blade 23 extends from the base of the U can be adjusted to any desired value by means of the adjusting screws 24 and then the blade can be blocked in this position by means of blocking screws (not represented).

The arm 4 also supports a stationary disc 25 provided with inclination markings in degrees and an arm 26 for holding the arm 21 at the desired initial inclination. The arm 26 is arranged to be able to rotate freely about the shank 18, and with respect to the disc 25, and can be blocked at any desired angular position by means of a screw 27 which can be tightened to lock the arm 26 against the disc 25.

Arm 26 is provided with a window 28 for permitting the angle indicia of disc 5 on which the arm 26 is centered, and hence the inclination of arm 26 with respect to the vertical, to be read. The arm 26 further carries a bolting device 29 in the form of a stirrup arranged to grip the suitably shaped end of an arm 30 which is supported by a sleeve which also supports arm 21 and which forms an extension of the arm 21. The bolting device 29 is connected to, and operated by, a compression spring-loaded pushbutton 31. The button 31 acts to normally hold the device 29 in a position such that it tightly grips the free end of arm 30. After the pivotal arrangement composed of arms 21 and 30 has been rotated into a position such that the free end of arm 30 is so gripped by, and bolted to, device 29, the bolting action of device 29 can be readily released simply by depressing button 31.

A device 32 mounted in the arm 3 permits, through the intermediary of a knurled screw 33, a limited degree of displacement of the shank 18 in the direction of its longitudinal axis.

An abutment 35, carrying a shock-absorbing element 36 is mounted on the base 1 and positioned to halt the movement of the pendulum after it has struck, and broken, the sample E. The pendulum arm 21 is adjusted to a length such that in its vertical rest position the blade 23 will bear against the rear side edge of the sample E, with respect to the view of FIG. 1. This, corresponds to the right-hand edge of the sample with respect to the view of FIG. 2.

The apparatus operates in a very simple manner. Firstly, a sample E of the material whose properties are to be studied is gripped between the jaws 6 and 7 by means of the gripping screws 9 and 12. Then, the handwheel 14 is rotated so as to subject the sample to a predetermined traction force, the magnitude of which is indicated by the scale 12 of dynamometer 8. Thereafter, the screw 33 is operated to displace the shank 18 in an axial direction so as to cause the blade 23 to be positioned midway between the ends of the sample E. Subsequently, the blocking arm 26 is placed at the desired inclination, the pendulum is rotated so as to be at the same inclination, and the arm 30 is bolted to the bolting arrangement 29 so as to hold the pendulum at the desired inclination. Finally, for making the test, it is only necessary to depress pushbutton 31 in order to free the pendulum so as to permit it to swing freely. The pendulum arm then pivots so as to permit the blade 23 to strike the sample E with an energy, and a velocity, which can be easily determined based on the unbalance weight of the pendulum and its starting inclination, which is determined by the inclination of blocking arm 26.

If it is necessary to increase the energy of the shock applied to the sample, this could be easily accomplished by increasing the effective weight of the metal mass 22, for example by the addition of supplemental plates.

A determination of the resilience under prestress conditions of a given material by means of the device illustrated in FIGS. 1 and 2 could be effectuated in the manner to be described below. It is preferred that the tests be carried out at a temperature of 20° C and in an atmosphere having a relative humidity of 65 percent. However, tests according to the invention can be carried out at other temperatures.

The tests may be carried out on a series of samples fabricated from the material to be examined according to type I, ISO R 527-1966 standards.

In the slot provided in the metal mass 22, a blade is mounted and positioned so that a predetermined length of the blade extends beyond the slot, for example a length of the order of 0.6 mm. Then, the blocking arm 26 is set at an inclination such that when the pendulum is released the energy with which the blade impacts on the sample will have a predetermined value, for example of the order of 4 kg.-cm.

One sample is then fixed between the jaws 6 and 7 and is placed under tension at a constant strain rate i.e. by rotating handwheel 14 at a constant rate. The selection of the tension to be applied for the first sample is determined by experience. If the properties of the material being tested are completely unknown, the initial tension can have any value.

Then, the pendulum is released after it has been verified that the blade will strike the central portion of the sample. If the sample does not break, it is replaced by another which is subjected to a greater tension before being struck in the same manner as described above. If this second sample also fails to break, the tension is increased still more for the next sample. This continues until one sample is broken by the impact of the blade 23.

After one sample has been thus broken, each succeeding sample is subjected to progressively less tension and is struck by the pendulum-mounted blade until a tension value is reached at which a sample again fails to break. Thereafter, for the following samples, the tension is once again progressively increased. By this procedure, it is possible to determine that tension value at which 50 percent of the samples break and 50 percent do not break and this tension value can suitably be called the "critical tension" or the "prestress impact strength."

An examination of the samples tested shows that all of the samples which are broken by the impact shock while being subjected to a tension force which is lower than their proportional limit break fragilely or brittlely, and that certain products do not break fragilely as a result of the impact shock, before attaining a tension equal to the proportional limit, but rather tear. In the case of products of the latter type, it is proper to state that such products are not fragile, or brittle, under the conditions of the test. A study of the samples tested also shows that the samples which do not break only bear very small traces of penetration by the blade at the location of the impact. However, if the tension applied to the sample is equal to or greater than the prestress impact strength, the fissure, which is then always terminated by a plastic deformation zone of greater or less extent, can have a penetration depth of several millimeters. The distribution of the observed results in the testing of homogeneous products is normally very limited. It is characterized by the range between that stress, or tension, for which 10 percent of the samples rupture and the stress for which 90 percent of the samples rupture. This indicated that the passage of a given material from the noncritical state to the critical state is abrupt. This passage through the critical tension is characterized by a rapid change in the nature of the fissure created by the shock impact of the blade.

In order to achieve repeatability and permit comparison of the prestress impact resistance tests according to the process, and with the test device, according to the invention, it is necessary to fix the test conditions which influence the recorded results. These factors are: the type of blade; the length of the portion of the blade which extends out of its holding slot; the velocity of the impact; and the energy of the impact.

Among the principle requirements which must be satisfied insofar as concerns the selection of the blade, should be included that: its cutting edge should have a high-mechanical strength; the blade, and particularly the cutting edge, should have a very small angle in order to avoid having the effect of spreading the sides of the fissure created by the impact; and it should have a very good resistance to oxidation. In addition, when a succession of blades are utilized during a series of tests, it is equally important to assure that the blades have uniform characteristics, particularly insofar as concerns the angle of their cutting edge, their thickness, and the centering of the cutting angle.

In all of the tests actually carried out to date, applicant has always utilized blades sold under the trade name of Stanley, No. 1991, a cutting angle of 24°, which blades were reduced, by machining, to a rectangular shape having dimensions of 13 mm. by 12 mm.

The three other variables, i.e. distance by which the blade extends from the slot, velocity of the impact, and energy of the impact, have a very significant influence on the value determined for the prestress impact strength.

The first factor, the length of blade which clears the slot, is determined by acting on the regulating screw 24, and this length must be adjustable to an accuracy of 0.02 mm. The two other factors are controlled as desired by acting on the starting angle of inclination of the pendulum and on the weight of the mass 22. By way of example, the table below presents, for a test material made of a polyvinyl chloride stabilized with lead, the variations in the measured prestress impact strength as a function of variations in the length of blade which extends from its holding slot and the energy of the shock impact, the weight of the metal mass 22 remaining constant.

TABLE

| Length of blade extending from slot, mm. | Energy content of impact shock, kg./cm. | Prestress impact strength, kg./cm.$^2$ |
| --- | --- | --- |
| 1.5 | 10 | 40 |
| 1.5 | 0.5 | 210 |
| 0.6 | 10 | 114 |
| 0.6 | 4 | 120 |
| 0.6 | 0.2 | 415 |
| 0.3 | 10 | 250 |
| 0.3 | 4 | 365 |
| 0.3 | 0.2 | 550 |

The above table immediately reveals that the prestress impact strength value measured according to the process of the invention varies considerably as a function of the choice of the indicated variables. A large number of actual tests carried out, to the present, on various polymers have shown that the use of a single set of test values is not justified. This is true because for one such set of test conditions there always exist certain materials which are fragile and which have a very low prestress impact strength and other materials having a greater mechanical strength and which can not be broken. It is thus difficult to correctly classify plastic materials having prestress impact strengths which place them at the two extremities of the measuring range.

It has thus proven necessary to establish a limited number of condition categories each having test conditions which are accurately defined but which are variable from one category to another, these categories extending from the most gentle tests to the most forceful, or brutal. This manner of proceeding has the advantage of greatly enlarging the scale of prestress impact strength values and of permitting a more precise classification of the various products which it is desired to test.

By way of example, after preliminary study, the test conditions adopted by applicant were fixed at the following values:

Reduced, or mild, conditions: blade projection, 0.3 mm; shock energy, 4 kg.-cm.

Normal conditions: blade projection, 0.6 mm; shock energy, 4 kg.-cm.

Severe conditions: blade projection, 1.5 mm; shock energy, 10 kg-cm.

In order to demonstrate the practical value of the process according to the invention for obtaining a better knowledge of the brittleness of plastic materials, applicant has studied, particularly with the aid of the process described, the effect of the addition of calcium carbonate on the brittleness of polyvinyl chloride. For this study, use was made of polyvinyl chloride made by the Solvic Company and identified as Benvicer 932. Use was made of three varieties of calcium carbonate, each variety produced by a different manufacturer, each variety of calcium carbonate being employed for a separate series of tests. One variety of calcium carbonate is manufactured by Solvay and Co. and is sold under the name Solvic $U_1S_2$. The other two varieties are made by other manufacturers and the results of tests carried out on samples employing these varieties of calcium carbonate are identified as A and B. The results on samples employing the Solvay product are identified as C. The calcium carbonate varieties made by the other two manufacturers need not be described in detail, nor need the manufacturers be identified, since it is only intended to demonstrate the comparison which can be obtained by utilizing the test method and apparatus according to the invention, and not to establish the relative merits of the several calcium carbonate varieties.

FIG. 3 is a chart showing the prestress impact strength, or resiliency, in kg./cm.$^2$, of the material under examination as a function of the calcium carbonate content, in percent, each of the three curves corresponding to a respective calcium carbonate variety. The curves shown in FIG. 3 were derived from data obtained by carrying out tests in accordance with the present invention.

FIG. 4 is a chart showing variations in the tensile impact energy, in kg.-cm./cm.$^2$, as a function of the calcium carbonate content in percent. These curves were derived from data obtained by testing samples according to one of the known procedures for determining tensile strength, which procedures were described in the Background of the Invention.

The dotted line portions of the curves A and C of FIG. 3 represent relatively high-calcium carbonate concentrations for which the resulting material exhibited a tendency to stretch rather than to break abruptly.

A comparative study of the curves of FIGS. 3 and 4 reveals that an increase in the calcium carbonate content of the resin increases its prestress impact strength, the varieties of calcium carbonate associated with curves A and C being particularly effective in this respect since a given concentration of these varieties produces a greater increase in the prestress impact strength. At the same time, the addition of calcium carbonate has an unfavorable influence on the tensile impact energy of the resin. For small concentrations of calcium carbonate, for example, of the order of 5 to 10, the tensile impact energy is substantially unchanged, at least in the best case represented by curve A. However, the tensile impact energy value decreases abruptly for all of the calcium carbonate varieties at higher concentrations.

Since the resistance of a material to shocks is based on a combination of the two properties illustrated in FIGS. 3 and 4, and since the values of these properties vary in opposite directions, the shock resistance of the polyvinyl chloride material containing one of the varieties of calcium carbonate involved in the test could be maximized by employing that calcium carbonate concentration which produces the highest prestress impact strength without substantially degrading the tensile impact energy of the resulting material. Taking the illustrated variations of the two component properties into consideration, it can be concluded that the inclusion in the resin of 10 percent calcium carbonate of the varieties corresponding to curves A and C diminishes the fragility of the resulting resin, and that the addition of 20 percent of these varieties of calcium carbonate to the material reduces both its ability to propagate ruptures and its cohesion. Since these two effects are in opposition to one another, it results that a product made of such a material will break, when subjected to a shock, by tearing without propagating a rupture.

It can be concluded from the above that the testing of a material in accordance with the present invention in combination with tensile impact tests according to the prior art can yield a very accurate indication of the fragility of the materials tested.

It will be appreciated that one of the essential advantages of the testing method and apparatus according to the invention is that it permits the various factors involved in the fragile, or brittle, rupture of plastic materials to be isolated from one another. In effect, it permits, provided that the energy content of the shock applied is low, a strict delimitation of the simple distribution of stresses around a fracture whose dimensions are known and which is propagated across the material. According to the invention, the dimensions of the initial fracture are known because the significant parameters of the impacting blade are accurately determined.

Thus, the present invention permits the attainment of an accurate determination of the aptitude of a given plastic material to propagate, when subjected to tension and to a shock whose energy intensity is known, a fissure initiated by a defect whose size is known, the size being determined by the dimensions of the blade and the energy of its impact with the sample. As a result, the invention attains the first basic test objective set forth above in the Background of the Invention, for evaluating the fragility, or brittleness, of a given material.

It will be understood that the above description of the present invention is susceptible to various modifications, changes and adaptations.

I claim:
1. A method for determining the brittleness of a rigid plastic material, comprising the steps of:
 a. subjecting a standardized sample of the material to a longitudinal tensile force;
 b. producing an impact against the side of the sample with an element which produces a notch while the sample is subjected to such tensile force, the impact having a predetermined energy content and being substantially perpendicular to the direction of the tensile force; and
 c. determining the minimum tensile force value or prestress impact strength, at which such impact produces a brittle rupture of the material.

2. A method as defined in claim 1 wherein a series of identical samples are subjected to different tensile force values above and below the value at which a brittle rupture occurs for accurately determining the minimum value of such force.

3. Apparatus for determining the value of the prestress impact strength of a rigid plastic material, comprising, in combination:
 a. tension means for subjecting a sample of such material to a controlled-tension force;
 b. tension-measuring means operatively connected to said tension means for providing an indication of the amplitude of the tension force applied to such sample; and
 c. striking means positioned for producing an impact having a predetermined energy content to the middle of said sample and in a direction substantially perpendicular to the direction of such tension force, said striking means comprising a pivotally mounted pendulum unit having a metal mass at its free end, said mass being provided with a slot extending parallel to the longitudinal axis of said unit, and said slot being provided with a blade mounted therein.

4. An arrangement as defined in claim 3 additionally comprising means mounted on said metal mass for maintaining said blade in its desired position, and wherein the length of said blade which projects from said slot is adjusted with an accuracy of 0.02 mm.

5. An arrangement as defined in claim 3 wherein said striking means further comprise a blocking element connected to said pendulum unit for holding said unit at any desired initial angular position and for permitting said unit to be abruptly released to pivot freely.